J. D. RENICK & K. C. KRICK.
SHEET METAL SEAL FOR PIPE CONNECTIONS.
APPLICATION FILED SEPT. 13, 1909.
969,981.
Patented Sept. 13, 1910.
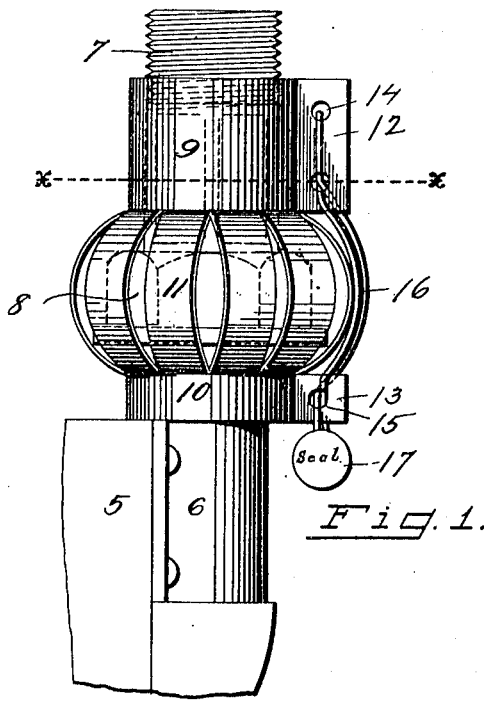
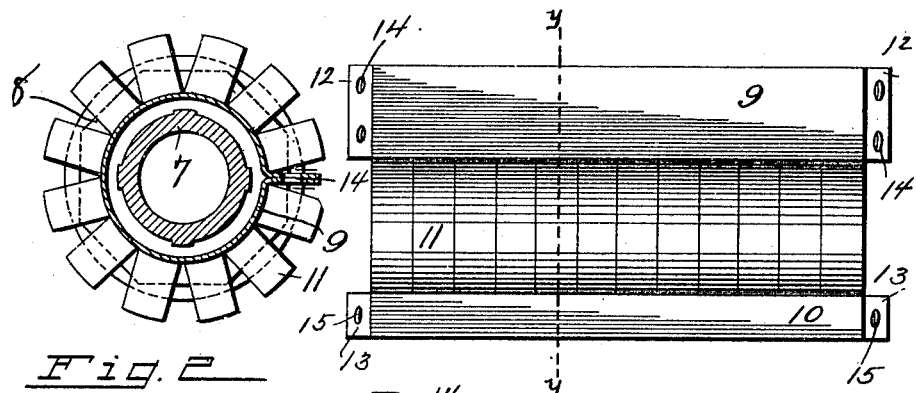
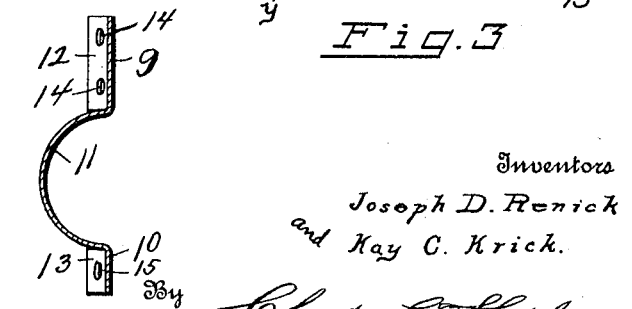
Inventors
Joseph D. Renick
and Kay C. Krick.

UNITED STATES PATENT OFFICE.

JOSEPH D. RENICK, OF LOUDONVILLE, AND KAY C. KRICK, OF COLUMBUS, OHIO.

SHEET-METAL SEAL FOR PIPE CONNECTIONS.

969,981.  Specification of Letters Patent.  Patented Sept. 13, 1910.

Application filed September 13, 1909. Serial No. 517,489.

*To all whom it may concern:*

Be it known that we, JOSEPH D. RENICK and KAY C. KRICK, citizens of the United States, residing at Loudonville and Columbus, in the counties of Ashland and Franklin and State of Ohio, have invented certain new and useful Improvements in Sheet-Metal Seals for Pipe Connections, of which the following is a specification.

This invention relates to a sheet metal seal for pipe connections, the object of the invention being to provide a device of this character so constructed that it may readily be stamped from sheet metal at a very small cost and will effectually prevent connected pipes to which it is applied from being disconnected as long as the seal is in position. It has been found that dishonest persons often entirely disconnect meters such as gas or water meters and bridge the space formerly occupied by said meters, thereby defrauding the gas or water companies.

The seal forming the subject matter of the present invention is particularly adapted for use upon the couplings of such meters and effectually prevents the meters from being tampered with.

Further objects and advantages of the invention will be set forth in the detailed description which now follows:

In the accompanying drawing: Figure 1 is a side elevation of a coupling seal constructed in accordance with the invention. Fig. 2 is a horizontal section upon line $x$—$x$ of Fig. 1, Fig. 3 is a view of the blank from which the seal is stamped before the seal is bent about the coupling, and, Fig. 4 is a cross section upon line $y$—$y$ of Fig. 3.

Like numerals designate corresponding parts in all of the figures of the drawing.

Referring to the drawing, the numeral 5 designates a meter of any desired construction having the usual supply conduit 6 to which a supply pipe 7 is connected through the medium of a nut 8.

The seal forming the subject matter of the present invention comprises bands 9 and 10, the band 9 being of considerably greater width than the band 10. It will be noted by referring to the blank shown in Fig. 3 that these bands are connected by a plurality of strips 11, the metal being slit to produce these separate strips. Ears 12 and 13 are formed at the ends of the bands 9 and 10 respectively and when the bands are bent about the nut 8 as shown in Fig. 1, perforations 14 and 15 of these ears are brought into alinement with each other so that the wire 16 may be passed through them. The ends of said wire being connected by a leaden or other soft metal seal 17, it is apparent that as long as the seal is in the position shown in Fig. 1, no tool can be applied to the coupling for the purpose of disconnecting the meter from the supply pipe 7.

The present invention comprises a seal adapted to serve all the purposes sought and yet one that can be formed from a blank at a single punching operation. It comprises no hinges and yet is sufficiently flexible to be bent around the pipe connection and snugly embraces the nut, the supply pipe 7 and the conduit.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described our invention, what we claim is:

A coupling seal of the character described, comprising a pair of bands adapted to encircle the annular portion of a coupling, a plurality of bowed strips connecting said bands within which an angular portion of said coupling lies, abutting perforated ears carried by both of said bands, and sealing means passing through all of the perforations.

In testimony whereof we affix our signatures in presence of two witnesses.

JOSEPH D. RENICK.
KAY C. KRICK.

Witnesses for Renick:
  HOMER LEE,
  HEATH K. COLE.

Witnesses for Krick:
  C. C. SHEPHERD,
  L. CARL STOUGHTON.